US 9,512,930 B2
Jerchen et al. (45) Date of Patent: Dec. 6, 2016

(54) PILOT-OPERATED PRESSURE CONTROL VALVE

(75) Inventors: Adrian Jerchen, Wuerzburg (DE); Thorsten Geiger, Backnang (DE); Ludmilla Graf, Lohr (DE)

(73) Assignee: Robert Bosch GmbH, Stuttgart (DE)

( * ) Notice: Subject to any disclaimer, the term of this patent is extended or adjusted under 35 U.S.C. 154(b) by 808 days.

(21) Appl. No.: 13/510,256

(22) PCT Filed: Oct. 15, 2010

(86) PCT No.: PCT/EP2010/006327
§ 371 (c)(1),
(2), (4) Date: Aug. 4, 2012

(87) PCT Pub. No.: WO2011/060857
PCT Pub. Date: May 26, 2011

(65) Prior Publication Data
US 2012/0305108 A1 Dec. 6, 2012

(30) Foreign Application Priority Data
Nov. 17, 2009 (DE) .......................... 10 2009 053 635

(51) Int. Cl.
*F16K 17/10* (2006.01)
*F16K 17/06* (2006.01)
(Continued)

(52) U.S. Cl.
CPC ............ *F16K 17/105* (2013.01); *F15B 13/025* (2013.01); *F16K 17/065* (2013.01); *G05D 16/18* (2013.01);
(Continued)

(58) Field of Classification Search
CPC .... F16K 17/065; F16K 17/105; F15B 13/024; G05D 16/18; G05D 16/18; Y10T 137/7762; Y10T 137/7764; Y10T 137/7765; Y10T 137/7766; Y10T 137/7769
(Continued)

(56) References Cited

U.S. PATENT DOCUMENTS 3,972,345 A    8/1976  Court
4,289,160 A *  9/1981  Kawasaki et al. ............ 137/491
(Continued)

FOREIGN PATENT DOCUMENTS

JP    56-143874 A    11/1981
JP    57-171171 A    10/1982

OTHER PUBLICATIONS

International Search Report corresponding to PCT Application No. PCT/EP2010/006327, mailed Jan. 24, 2011 (German and English language document) (6 pages).
(Continued)

*Primary Examiner* — William McCalister
(74) *Attorney, Agent, or Firm* — Maginot, Moore & Beck LLP

(57) ABSTRACT

A pilot-controlled pressure control valve is disclosed. The pilot-controlled pressure control valve has a pilot control stage, a spool valve, and an overload spring. The pilot control stage includes a pilot control piston which has a pilot control spring. The pilot control spring acts in a closing direction of the pilot control stage. The pilot control spring is supported on the spool valve which can be positioned by a control pressure against the force of the overload spring. The control pressure is configured to set a preload of the pilot control spring. At the same time, in a loaded position, in which the pilot control valve has minimum preload, the spool valve rests against a stop. A preload of the overload spring and a position of the stop can be set independently of one another.

13 Claims, 1 Drawing Sheet

(51) Int. Cl.
*F15B 13/02* (2006.01)
*G05D 16/18* (2006.01)

(52) U.S. Cl.
CPC ..... *Y10T 137/7762* (2015.04); *Y10T 137/7765* (2015.04); *Y10T 137/7766* (2015.04); *Y10T 137/7769* (2015.04)

(58) Field of Classification Search
USPC .......................... 137/488, 489, 490, 491, 492
See application file for complete search history.

(56) References Cited

U.S. PATENT DOCUMENTS

| | | | |
|---|---|---|---|
| 4,476,890 A * | 10/1984 | Kawasaki et al. | 137/269 |
| 5,992,450 A * | 11/1999 | Parker et al. | 137/491 |
| 6,039,070 A * | 3/2000 | Zaehe | 137/491 |
| 2005/0178443 A1* | 8/2005 | Cheong | 137/491 |
| 2005/0183775 A1* | 8/2005 | Cheong | 137/491 |
| 2009/0211650 A1* | 8/2009 | Jeon | 137/488 |

OTHER PUBLICATIONS

Bosch Rexroth AG, "Druck- und Einspeiseventile für mobile Anwendungen, Typ MHDB und MHSV", Data Sheet RD 64642/04.15, dated Apr. 1, 2015, p. 16 (20 pages total).

\* cited by examiner

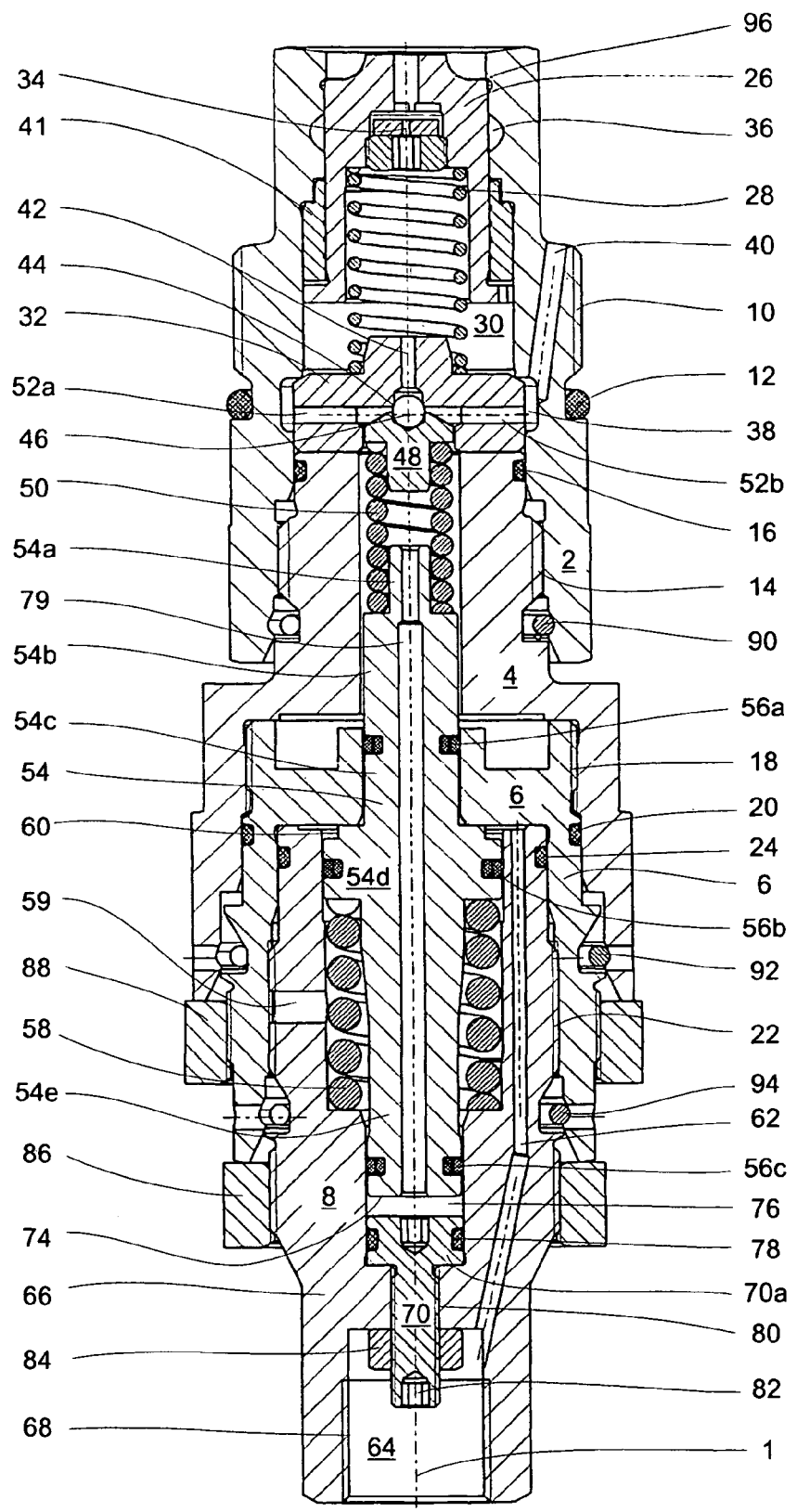

PILOT-OPERATED PRESSURE CONTROL VALVE

This application is a 35 U.S.C. §371 National Stage Application of PCT/EP2010/006327, filed on Oct. 15, 2010, which claims the benefit of priority to Serial No. DE 10 2009 053 635.3, filed on Nov. 17, 2009 in Germany, the disclosures of which are incorporated herein by reference in their entirety.

BACKGROUND

The disclosure relates to a pilot-controlled pressure limiting valve.

In pressure limiting valves having a main piston which opens up an outlet when a maximum pressure is exceeded, the pressure to be limited acts substantially counter to a regulating spring which acts in the closing direction. With increasing volume flow through the pressure limiting valves, an increase in the seat and/or slide diameter and of the regulating springs is necessary. Here, the necessary spring force increases quadratically with the seat and/or slide diameter.

To keep the installation space within reasonable dimensions, pressure limiting valves are of pilot-controlled design. The main piston of such valves is subjected to an additional pressure loading in the closing direction, wherein said pressure can be dissipated via a pilot control valve. Said pilot control valve is a directly controlled pressure limiting valve. As a result of the additional reducible closing force, the main stage of the valve can be designed to be smaller than that in a directly controlled pressure limiting valve.

The applicant's data sheet RD 64642/11.06 presents, on page 17, an MHDBLS type pilot-controlled pressure limiting valve in which the response behavior of the pilot control stage can be adjusted through the positioning of a control slide. For this purpose, the preload of a pilot control spring which is supported on the control slide is varied. The control slide is loaded on one side by an overdrive spring and on the other side by a control pressure. Here, the overdrive spring acts in a direction for increasing the preload of the pilot control spring, whereas the control pressure acts in a direction for reducing the preload of the pilot control spring.

A disadvantage of such pilot-controlled pressure limiting valves is that the control pressure required for displacing the control slide, and a stop which defines the minimum preload of the pilot control spring, can only be adjusted jointly by rotating an adjusting sleeve in a sleeve.

By contrast, it is the object of the disclosure to provide a pilot-controlled pressure limiting valve in which the flexibility of adjustment possibilities is increased.

Said object is achieved with a pilot-controlled pressure limiting valve.

SUMMARY

The pilot-controlled pressure limiting valve has a main stage and a pilot control stage, the pilot control piston of which is loaded by a pilot control spring in a closing direction of the pilot control stage, wherein the pilot control spring is supported on a control slide which can be positioned by a control pressure counter to the force of an overdrive spring in order to adjust a preload of the pilot control spring. Here, in a relaxation position in which the pilot control spring has a minimum preload, the control slide bears against a stop. According to the disclosure, a preload of the overdrive spring and a position of the stop can be adjusted independently of one another. In this way, the flexibility of the pressure limiting valve is increased, because the control pressure required to displace the control slide and the minimum preload of the pilot control spring can be adjusted independently of one another.

Further advantageous refinements of the disclosure are described below.

In a particularly preferred refinement of the pressure limiting valve according to the disclosure, the stop is formed by a stop screw which is screwed into an adjusting sleeve, whereas the preload of the overdrive spring can be adjusted by means of the adjusting sleeve which is screwed into a sleeve. The capability for separate adjustment is thus realized with little outlay from a device aspect.

For simple adjustability even in the assembled state of the valve according to the disclosure, it is preferable for the adjusting sleeve to have a free end portion by means of which it can be rotated, and for a hexagon of the stop screw to be arranged adjacent to or in the free end portion of the adjusting sleeve.

In a preferred embodiment, the control slide is loaded by the overdrive spring in a stressing direction to increase the preload of the pilot control spring, and can be loaded by the control pressure in a relaxation direction to reduce the preload of the pilot control spring. Here, the two directions run along a valve longitudinal axis. A pilot-controlled pressure limiting valve is thus provided whose main stage has a maximum system or response pressure when the control pressure is reduced, while having a reduced system or response pressure when the control pressure is increased.

Here, between the sleeve and the control slide, there may be arranged an annular chamber which is connected via at least one control pressure duct, which is eccentric with respect to the valve longitudinal axis, to a control pressure port of the valve, wherein said control pressure port is arranged on the free end portion of the adjusting sleeve.

A stressing position of the control slide, in which the pilot control spring has a maximum preload, can preferably be adjusted by screwing the sleeve into a reduction piece. The maximum system or response pressure of the pressure limiting valve can be adjusted in this way.

For a compact valve construction, the overdrive spring may be arranged in the direction along the longitudinal axis and in the radial direction between the control slide and the adjusting sleeve. Furthermore, the control slide may have a pilot control spring portion engaged around by the pilot control spring and a reduction piece portion engaged around by the reduction piece and a sleeve portion engaged around by the sleeve and two adjusting sleeve portions engaged around by the adjusting sleeve, wherein between the two adjusting sleeve portions there is arranged an overdrive spring portion, engaged around by the overdrive spring, of the control slide.

To secure the adjusted stop screw for the minimum preload of the pilot control spring and/or to secure the preloads of the overdrive spring and/or of the pilot control spring, it is preferable for the stop screw to have a lock nut which bears against the adjusting sleeve and/or the adjusting sleeve has a lock nut which bears against the sleeve and/or the sleeve has a lock nut which bears against the reduction piece.

For a compact valve construction, the hexagon and the lock nut of the stop screw may be arranged in the control pressure port.

To ensure low-resistance movement of the control slide as a result of pressure equalization, it is preferable for the control slide to have a longitudinal duct which connects a chamber, which is formed between a stop surface of the control slide and the stop screw, and a pilot control spring chamber, which is formed between the pilot control piston and the control slide.

In a preferred refinement of the valve according to the disclosure, the pilot control piston, the pilot control spring, the pilot control spring chamber, the reduction piece, the sleeve, the adjusting sleeve, the annular chamber, the overdrive spring, the stop screw, the chamber, the control pressure port, the lock nuts and the control slide with the stop surface and with the longitudinal duct are arranged substantially concentrically with respect to the valve longitudinal axis.

A particularly preferred refinement of the valve according to the disclosure is a feed valve with a replenishing function which is integrated into the main stage and which enables replenishment of a pressure medium by being sucked from a tank. It is thus possible, in the event of a pressure drop in a hydraulic arrangement connected to the valve, for pressure medium to be replenished and cavitation prevented.

BRIEF DESCRIPTION OF THE DRAWING

An exemplary embodiment of the disclosure is described in detail below on the basis of a single FIGURE.

The FIGURE shows an exemplary embodiment of a pilot-controlled pressure limiting valve according to the disclosure in section as viewed from the side.

DETAILED DESCRIPTION

The pressure limiting valve is configured substantially rotationally symmetrically or concentrically about its longitudinal axis 1 and has a housing 2, a reduction piece 4, a sleeve 6 and an adjusting sleeve 8. The housing 2 is screwed with a thread 10 into a hydraulic device (not shown) and, here, is sealed off with a sealing ring 12. The reduction piece 4 is screwed with a thread 14 into the housing 2 and is sealed off with a sealing ring 16. The sleeve 6 is screwed with a thread 18 into the reduction piece 4 and is sealed off with a sealing ring 20. The adjusting sleeve 8 is screwed with a thread 22 into the sleeve 6 and is sealed off with a sealing ring 24.

In the housing 2 there is arranged a main stage which has a main piston 26 which is displaceable along the longitudinal axis 1. Here, said main piston is acted on on its upper side (in the FIGURE) by a system pressure of the hydraulic device (not shown), whereas the lower side (in the FIGURE) of said main piston is acted on by a main piston spring 28 and a pressure in a spring chamber 30. The system pressure of the hydraulic device acts in the opening direction of the main piston 26, which opening direction is directed downward (in the FIGURE), whereas the force of the main piston spring 28 and the pressure in the spring chamber 30 act in the closing direction of the main piston 26. Here, the main piston spring 28 is supported on an intermediate piece 32 which is accommodated in the housing 2 and which is fixedly clamped between a shoulder of the housing 2 and the reduction piece 4.

Provided in the main piston 26 is a duct 34 which enables transmission of the pressure of the hydraulic device into the spring chamber 30. The pressure is limited.

An encircling groove 36 is arranged on an inner circumferential portion of the housing 2 which in the closed state of the main stage is covered by the main piston 26. Furthermore, an encircling groove 38 is provided on an inner circumferential portion of the housing 2 which is covered by the intermediate piece 32. When the pilot-controlled pressure limiting valve according to the disclosure is in the installed state in the hydraulic arrangement, said two grooves 36, 38 are connected via tank ducts to a tank (not shown), wherein only a tank duct 40 of the groove 38 is shown in the FIGURE.

The main stage has a replenishing function which, for example, when a consumer connected to the hydraulic device is in a leading state, enables a pressure medium to be replenished by being sucked into the hydraulic device from the tank. Here, a replenishing ring 41 drives the main piston 26 downward (in the FIGURE) and opens a connection from the tank to the hydraulic device.

In the intermediate piece 32 and in the reduction piece 4 there is provided a directly controlled pressure limiting valve which is formed as a seat valve and which serves as a pilot control stage of the pressure limiting valve according to the disclosure. It is composed substantially of a longitudinal duct 42, a valve seat 44, a ball 46 which bears against said valve seat and which is fastened to a pilot control piston 48, a pilot control spring 50 and at least two radial tank ducts 52a, 52b. The longitudinal duct 42 connects the spring chamber 30 to the valve seat 44. The ball 46 is braced against the valve seat 44 with the pilot control piston 48 and with the pilot control spring 50. The radial tank ducts 52a, 52b connect the valve seat 44 to the tank via the groove 38 and via the tank ducts 40.

The pilot control spring 50 is accommodated in the reduction piece 4 and is supported on a control slide 54. Said control slide has a pilot control spring portion 54a engaged around by the pilot control spring 50, a reduction piece portion 54b received with a clearance fit in the reduction piece 4, and a sleeve portion 54c which is mounted in a sliding fashion in the sleeve 6 and which is sealed off in the sleeve 6 by means of a piston seal 56a. Furthermore, the control slide 54 has a radially widened adjusting sleeve portion 54d and an adjusting sleeve portion 54e which is of reduced diameter in relation to said adjusting sleeve portion 54d, said adjusting sleeve portions each being mounted in a sliding fashion in the adjusting sleeve 8.

Between the two adjusting sleeve portions 54d, 54e there is accommodated an overdrive spring 58 which is supported on the adjusting sleeve 8 and which preloads the control slide 54, by radially widening the adjusting sleeve portion 54d thereof, upward (in the FIGURE) against an inner annular end surface of the sleeve 6. A spring chamber of the overdrive spring 58 is sealed off with piston seals 56b, 56c of the adjusting sleeve portions 54d, 54e and is discharged to the atmosphere via a relief bore 59.

Between an annular end surface of the adjusting sleeve portion 54d of the control slide 54 and the inner annular end surface of the sleeve 6 there is formed an annular chamber 60. Said annular chamber is connected via at least one eccentric control pressure duct 62, which runs through the adjusting sleeve 8, to a control pressure port 64, which is arranged on a free end portion 66 of the adjusting sleeve 8, of the pressure limiting valve according to the disclosure. The control pressure port 64 is of hollow cylindrical form and has an internal thread 68 which serves for the connection of a control pressure line (not shown).

In a region of the adjusting sleeve 8 arranged between the control pressure port 64 and a receptacle for the adjusting sleeve portion 54e, a stop screw 70 is screwed in. Said stop screw 70 has a radially widened portion 70a whose diameter corresponds approximately to that of the adjusting sleeve portion 54e of the control slide 54. The widened portion 70a serves as a stop for an end-side stop surface 74 of the control slide 54, wherein in the clamping position of the control slide 54 shown in the FIGURE, a chamber 76 remains between the stop surface 74 and the widened portion 70a. The chamber 76 is sealed off with respect to the control pressure port with a sealing ring 78 of the widened portion 70a and is connected via a longitudinal duct 79 of the control slide 54 to a pilot control spring chamber of the pilot control stage.

The stop screw 70 can be positioned along the longitudinal axis 1 of the valve with a thread 80. On an end portion, which extends into the control pressure port 64, of the stop screw 70 there is provided a hexagonal socket 82 which turns the stop screw 70. A position, thus selected, of the stop screw 70 relative to the adjusting sleeve 8 is secured with a lock nut 84 which is screwed onto the thread 80.

A set position of the adjusting sleeve 8 in the sleeve 6 is secured with a lock nut 86, whereas a selected position of the sleeve 6 in the reduction piece 4 is secured with a lock nut 88.

A circlip 90 is provided to prevent the reduction piece from being fully unscrewed from the housing 2, whereas circlips 92, 94 respectively prevent the sleeve 6 from being unscrewed from the reduction piece 4 and prevent the adjusting sleeve 8 from being unscrewed from the sleeve 6.

The FIGURE shows the pilot-controlled pressure limiting valve according to the disclosure in a state in which the main piston 26 is in its upper position (in the FIGURE), and here, bears against a valve seat 96. The main stage of the pressure limiting valve is thus closed.

The pilot control spring 50 is preloaded to a maximum extent because the control slide 54 bears, upward (in the FIGURE) along the longitudinal axis 1, via its adjusting sleeve portion 54d against the sleeve 6. The pressure required in the spring chamber 30 to open the pilot control stage is therefore at a maximum. Said maximum pressure can be varied by rotating the sleeve 6 in the reduction piece 4, wherein only a reduction of the maximum pressure is possible proceeding from the position of the sleeve 6 shown in the FIGURE.

The pressure required in the spring chamber 30 to open the pilot control stage can be reduced during operation of the valve by virtue of a control pressure at the control pressure port 64 being increased, wherein said control pressure acts in the annular chamber 60 via the control pressure duct 62 and moves the control slide 54 downward (in the FIGURE). This takes place counter to the force of the overdrive spring 58, which is supported against the adjusting sleeve 8 and preloads the control slide 54 in the basic position shown.

The control pressure required for discharging the pilot control stage can be reduced by virtue of the preload of the overdrive spring 58 being reduced. This is done by unscrewing the adjusting sleeve 8 out of the sleeve 6, wherein the FIGURE shows the maximum preload of the overdrive spring 58.

At a predetermined control pressure, the control slide 54 comes into contact, via its stop surface 74, with the widened portion 70a of the stop screw 70. Then, even with a further increase in the control pressure, no further relaxation of the pilot control spring 50 is possible, and therefore no further reduction of the opening pressure of the pilot control stage is possible. Said limitation of the pressure reduction is possible by turning the stop screw 70 in the adjusting sleeve 8 by means of the hexagonal socket 82. Said adjustment—like the adjustment of the preload of the overdrive spring 58 and of the pilot control spring 50—is realized by loosening of the respective lock nut 84, 86, 88 followed by turning of the corresponding adjusting part 6, 8, 70 with subsequent locking by the lock nuts 84, 86, 88.

If the opening force exerted on the ball 46 by the pressure medium in the spring chamber 30 exceeds that of the adjustable pilot control spring 50, the pilot control stage opens, and pressure medium from the spring chamber 30 escapes via the tank duct 40 to the tank. After said discharging of the spring chamber 30, the opening force prevails at the main piston 26, and it moves downward (in the FIGURE) along the longitudinal axis 1. As a result, pressure medium can flow out of the hydraulic device (not shown) via the groove 36 and tank ducts (not shown) to the tank.

The duct 34 in the main piston 26 is formed as a nozzle whose cross section is smaller in a flow direction from the hydraulic arrangement (not shown) to the spring chamber 30 than in a reverse flow direction from the spring chamber 30 to the hydraulic arrangement. The low-resistance flow from the spring chamber 30 to the hydraulic arrangement is necessary if the replenishing function of the valve is activated, in which the replenishing ring 41 pushes the main piston 26 downward (in the FIGURE).

Disclosed is a pilot-controlled pressure limiting valve having a pilot-control stage, the pilot control piston of which is loaded by a pilot control spring in a closing direction of the pilot control stage, wherein the pilot control spring is supported on a control slide which can be positioned by a control pressure counter to the force of an overdrive spring in order to adjust a preload of the pilot control spring. Here, in a loading position (not shown) in which the pilot control spring has a minimum preload, the control slide bears against a stop. According to the disclosure, a preload of the overdrive spring and a position of the stop can be adjusted independently of one another.

LIST OF REFERENCE SYMBOLS

1 Longitudinal axis
2 Housing
4 Reduction piece
6 Sleeve
8 Adjusting sleeve
10, 14, 18, 22 Thread
12, 16, 20, 24 Sealing ring
26 Main piston
28 Main piston spring
30 Spring chamber
32 Intermediate piece
34 Duct
36, 38 Groove
40 Tank duct
41 Replenishing ring
42 Longitudinal duct
44 Valve seat
46 Ball
48 Pilot control piston
50 Pilot control spring
52a, 52b Tank duct
54 Control slide
54a Pilot control spring portion
54b Reduction piece portion
54c Sleeve portion
54d, 54e Adjusting sleeve portion
56a, 56d, 56c Piston seal
58 Overdrive spring
59 relief bore
60 Annular chamber
62 Control pressure duct 64 Control pressure port
66 Free end portion
68 Internal thread
70 Stop screw
70a Widened portion
74 Stop surface
76 Chamber
78 Sealing ring
79 Longitudinal duct
80 Thread
82 Hexagonal socket
84, 86, 88 Lock nut
90, 92, 94 Circlip
96 Valve seat

The invention claimed is:

1. A pilot-controlled pressure limiting valve comprising:
a main stage; and
a pilot-control stage including a pilot control piston that is loaded by a pilot control spring in a closing direction of the pilot control stage,
wherein the pilot control spring is supported on a control slide which is configured to be positioned by a control pressure counter to a force of an overdrive spring in order to adjust a preload of the pilot control spring,
wherein, in a loading position in which the pilot control spring has a minimum preload, the control slide bears against a stop,
wherein a preload of the overdrive spring is configured to be adjusted by screwing an adjusting sleeve into a sleeve,
wherein the stop is formed by a stop screw that is screwed into the adjusting sleeve, the stop screw being individually adjustable in relation to the adjusting sleeve,
wherein the preload of the overdrive spring is configured to be adjusted independently of a spacing of the stop from the control slide by (i) screwing the adjusting sleeve relative to the sleeve and (ii) screwing the stop screw relative to the adjusting sleeve, and
wherein the spacing of the stop from the control slide is configured to be adjusted independently of the preload of the overdrive spring by screwing the stop screw relative to the adjusting sleeve.

2. The pressure limiting valve of claim 1, wherein:
the adjusting sleeve has a free end portion by which it is configured to be rotated; and
a hexagon of the stop screw is arranged adjacent to or in the free end portion of the adjusting sleeve.

3. The pressure limiting valve of claim 2, wherein:
the control slide is loaded by the overdrive spring in a stressing direction for increasing the preload of the pilot control spring, and is configured to be loaded by the control pressure in a relaxation direction for reducing the preload of the pilot control spring, and
the stressing direction and the relaxation direction run along a longitudinal axis of the pressure limiting valve.

4. The pressure limiting valve of claim 3, wherein:
between the sleeve and the control slide is an annular chamber which is connected via at least one control pressure duct to a control pressure port of the pressure limiting valve;
the control pressure duct is eccentric with respect to the longitudinal axis; and
the control pressure port is arranged on the free end portion of the adjusting sleeve.

5. The pressure limiting valve of claim 4, wherein:
a stressing position of the control slide, in which the pilot control spring has a maximum preload, is configured be adjusted by screwing the sleeve into a reduction piece.

6. The pressure limiting valve of claim 5, wherein:
the overdrive spring is arranged along the longitudinal axis and radially between the control slide and the adjusting sleeve.

7. The pressure limiting valve as claimed in of claim 6, wherein the control slide includes:
a pilot control spring portion engaged around by the pilot control spring;
a reduction piece portion engaged around by the reduction piece;
a sleeve portion engaged around by the sleeve; and
two adjusting sleeve portions engaged around by the adjusting sleeve, wherein between the two adjusting sleeve portions there is a portion, engaged around by the overdrive spring, of the control slide.

8. The pressure limiting valve of claim 7, wherein:
the stop screw has a lock nut which bears against the adjusting sleeve and/or the adjusting sleeve has a lock nut which bears against the sleeve and/or the sleeve has a lock nut which bears against the reduction piece.

9. The pressure limiting valve of claim 8, wherein:
the hexagon and the lock nut of the stop screw are arranged in the control pressure port.

10. The pressure limiting valve of claim 9, wherein:
the control slide has a longitudinal duct which connects a chamber, and a pilot control spring chamber;
the chamber is formed between a stop surface of the control slide and the stop screw; and
the pilot control spring chamber is formed between the pilot control piston and the control slide.

11. The pressure limiting valve of claim 10, wherein the pilot control piston and the pilot control spring and the pilot control chamber and the reduction piece and the sleeve and the adjusting sleeve and the annular chamber and the overdrive spring and the stop screw and the chamber and the control pressure port and the lock nuts and the control slide with the stop surface and with the longitudinal duct are arranged substantially concentrically with respect to the valve longitudinal axis.

12. The pressure limiting valve of claim 11, wherein:
the pressure limiting valve is a feed valve with a replenishing function which is integrated into the main stage and which enables a pressure medium to be replenished by being sucked from a tank.

13. The pressure limiting valve of claim 1, wherein:
the preload of the overdrive spring and the spacing of the stop from the control slide are configured to be adjusted independently of one another without changing the preload of the pilot control spring.

* * * * *